United States Patent
Yamada et al.

[11] Patent Number: 5,659,235
[45] Date of Patent: Aug. 19, 1997

[54] DRIVE CONTROLLER AND CONTROL METHOD FOR ELECTRIC VEHICLE

[75] Inventors: Hiroyuki Yamada, Hitachinaka; Nobunori Matsudaira, Hitachi; Sanshiro Obara, Ibaraki, all of Japan

[73] Assignees: Hitachi, Ltd.; Hitachi Car Engineering Co., Ltd., both of Japan

[21] Appl. No.: 605,665

[22] Filed: Feb. 22, 1996

[30] Foreign Application Priority Data

Feb. 22, 1995 [JP] Japan .................................. 7-034067

[51] Int. Cl.$^6$ .................................................. H02P 7/63
[52] U.S. Cl. .................... 318/801; 318/139; 318/432; 318/811
[58] Field of Search .................................. 318/139, 432, 318/433, 727, 767, 798–802, 804, 810, 811; 363/74, 123, 124, 131, 132

[56] References Cited

U.S. PATENT DOCUMENTS

| 5,168,204 | 12/1992 | Schauder ................................ 318/800 |
| 5,227,703 | 7/1993 | Boothe et al. ........................... 318/139 |

FOREIGN PATENT DOCUMENTS

| 62-12754 | 3/1987 | Japan . |
| 62-213503 | 9/1987 | Japan . |
| 62-233002 | 10/1987 | Japan . |
| 62-247703 | 10/1987 | Japan . |

*Primary Examiner*—Bentsu Ro
*Attorney, Agent, or Firm*—Evenson, McKeown, Edwards & Lenahan P.L.L.C.

[57] ABSTRACT

In an electric vehicle drive controller, a drive controller has a controlling means which incorporates means for calculating a magnetic flux command from a basic torque command, for calculating a torque current command, exciting current command and slip frequency, and for operating vector calculation, and drives the motor. Voltage or power density of the power source is input to a correction coefficient calculating means and then input to a magnetic flux generating means by a correction coefficient to correct a magnetic flux. A magnetic flux generating means calculates the magnetic flux command by limiting and correcting the magnetic flux command according to the basic torque command and rotating speed, and determines a control variable for the magnetic flux command in correspondence to the motor rotating speed and torque command. By controlling the voltage to be applied to the motor in correspondence to the quantity of state of power source, it is possible to operate a drive unit on the most efficient point and reduce the size of electric power converter.

10 Claims, 6 Drawing Sheets

EQUATION a: $\phi_a = T_1 - T_L$

DRIVE CONTROLLER AND CONTROL METHOD FOR ELECTRIC VEHICLE

BACKGROUND OF THE INVENTION

The present invention is related to method for operating an electric car drive controller which vector controls an induction motor.

A known arrangement for vector control of an induction motor is disclosed in the patent journal Japanese Patent Publication 62-12754. According to the method disclosed in the patent, when an induction motor is operated at a constant output power in a speed range above the base speed, increase of the induction motor voltage while the motor is operated at a speed above the base speed is controlled by using a function generator, which weakens a magnetic flux command generating means in inverse proportion to the rotating speed.

The Japanese Patent Application 62-233002 discloses another method, which calculates an optimum motor magnetic flux from the required target torque and required number of revolutions of an induction motor to minimize the overall motor loss. In order to minimize power consumption, it supplies a primary current that allows the motor loss to be the lowest at any time in the course of and after adjustment of the motor magnetic flux and torque current.

In the prior art such as disclosed in the aforesaid patent journal Japanese Patent Publication 62-12754, the magnetic flux command is intensified regardless of the strength of the output torque when the rotating speed is below the base speed. Accordingly, excessive magnetic fluxes are always generated in the induction motor even in case of small output torque, thus possibly causing a decrease in efficiency.

In addition, because of output power limitation of the electric power converter, it is necessary to employ a so called weak magnetic field control in the high speed range by further lowering the output characteristic below the constant output power, so that the induction motor voltage should not increase in the high speed operation. For this reason, a control method for weakening the magnetic flux command in correspondence to the rotating speed is employed using a function, but no consideration is given to increasing the efficiency.

Because the method requires that a voltage in excess of the capacity of the electric power converter be applied to the motor in high speed operation, it is understood that insufficient consideration is given to size reduction of the electric power converter which drives the induction motor.

On the other hand, charge state of the power source is not considered in the prior art disclosed in the patent journal Japanese Patent Application 62-233002. Because a battery, for example, is used as the power source for an electric vehicle, the residual battery charge varies drastically during running. When charge state of the power source is high, it is possible to apply a voltage to the induction motor which is higher than the design voltage (within the limit of the capacity of the electric power converter), to reduce copper loss of the motor and loss in the electric power converter, and to improve the overall efficiency of the controller. No consideration is given to this issue in the prior art.

SUMMARY OF THE INVENTION

In view of the above problems, an object of the present invention it to furnish a controller or control method which permits calculation of an optimum magnetic flux command corresponding to the required output torque and charge state of the power source, and to operate an electric vehicle drive controller at the most efficient operating point at any time.

Another object of the present invention is to reduce the size of an electric power converter in an electric vehicle drive controller.

To achieve the aforesaid objects, the present invention provides a drive controller for an electric vehicle having an induction motor for driving the vehicle, an electric power converter for converting electric power from a DC source and supplying the power to the induction motor, and a controller for controlling the induction motor via the electric power converter according to a given command. A basic torque command for controlling the primary current of the induction motor is divided into a torque command and a magnetic flux command; a torque current component is generated from the torque command, while an exciting current component is generated from the magnetic flux command, respectively; and the induction motor is vector controlled. According to the invention, the drive controller determines the magnetic flux command according to the basic torque command transmitted to the induction motor and the rotating speed of the induction motor; it also corrects the magnetic flux command, increasing or decreasing it corresponding to the charge state of the power source, so that the magnetic flux command increases when the given charge quantity is favorable.

According to another feature of the present invention, a basic magnetic flux command calculator calculates a basic magnetic flux command from the torque command, and a rotating speed correcting unit corrects the basic magnetic flux command according to the rotating speed of the induction motor. A magnetic flux limiting unit determines the upper limit of the magnetic flux command, and a torque limiting unit determines the upper limit of the torque command, both according to the rotating speed of said induction motor. A magnetic flux correcting unit calculates a magnetic flux correction value for correcting the magnetic flux command according to the torque command, and a magnetic flux rotating speed correcting unit calculates a coefficient for correcting the magnetic flux correction value according to the rotating speed of said induction motor.

According to the present invention, it is possible to increase the voltage applied to the motor within the limit of the output capacity of the electric power converter, and to operate the motor on the most efficient operating point by correcting the magnetic flux command for controlling the induction motor corresponding to the charge state of the power source of the electric power converter.

According to another feature of the present invention, the basic magnetic flux command is calculated by the basic magnetic flux calculating unit from the required torque command generated by the motor. When the torque generated by the motor is low (that is, when the torque command is a small value), it is possible to lower the copper loss of the motor and loss in the electric power converter, thereby increasing the efficiency, by decreasing the basic magnetic flux command to attain the basic magnetic flux command corresponding to the torque command, further calculating the magnetic flux command after rotating speed correction and power source correction, and controlling the electric power converter according to this final magnetic flux command.

Moreover, when the residual charge of the battery is sufficient, it is possible to increase the voltage applied to the motor within the limit of the output capacity of the electric power converter, and to operate the controller on the most efficient operating point by correcting the limiting value of the final magnetic flux command, correcting each output value of the torque controlling unit and magnetic flux limiting unit in the power source correcting unit according to the voltage of the electric power converter, for example, charge state, residual charge, or power density of the battery.

Because voltage to be applied to the motor can freely be set according to the rotating speed of the motor or charge state of the power source, it is not necessary in high speed operation to apply voltage to the motor in excess of the capacity of the electric power converter in order to reduce the size of the electric power converter.

Other objects, advantages and novel features of the present invention will become apparent from the following detailed description of the invention when considered in conjunction with the accompanying drawings.

DETAILED DESCRIPTION OF THE PREFERRED EMBODIMENTS

Preferred embodiments of the present invention will be described hereunder by using drawings.

Figure 1:
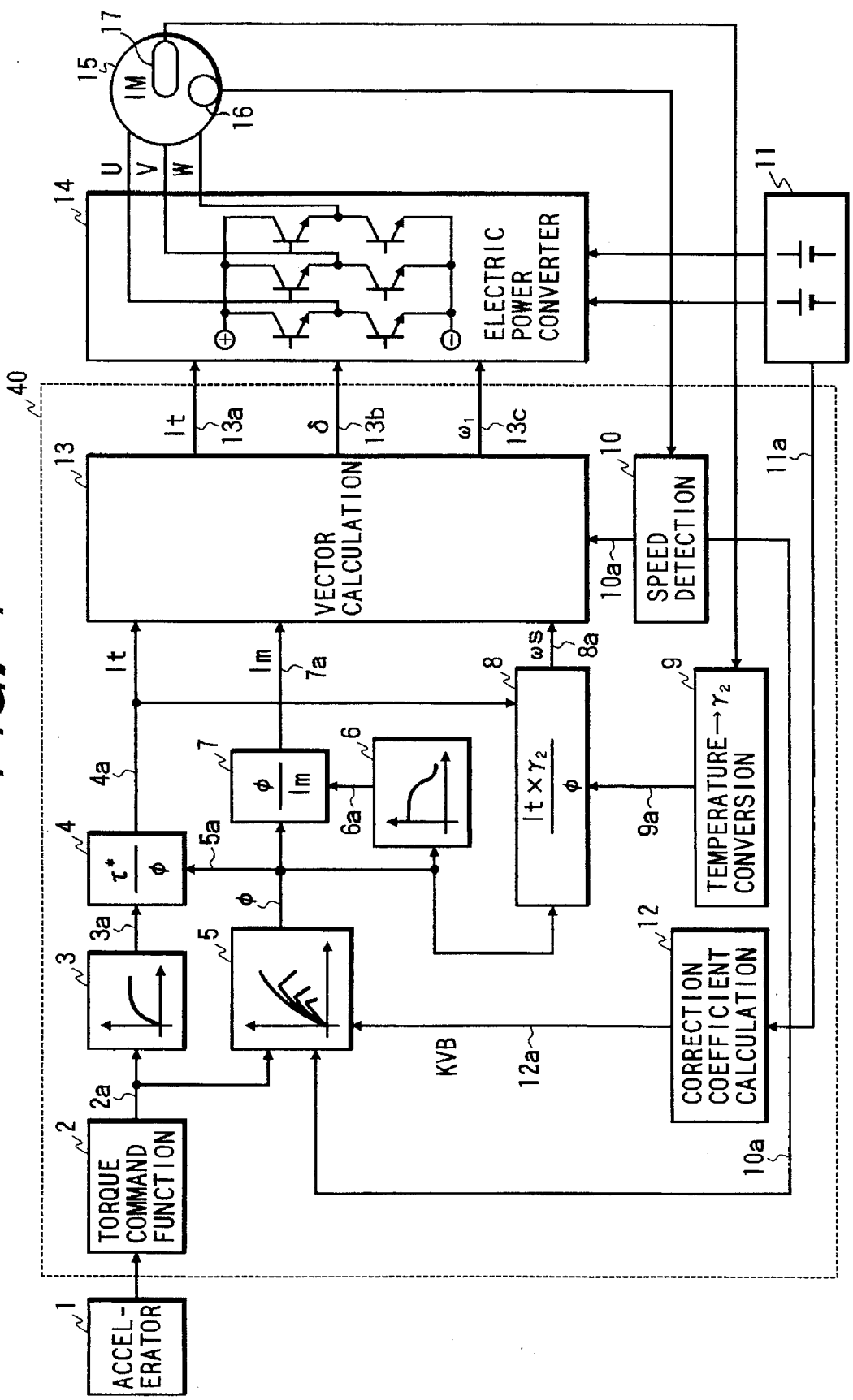
FIG. 1 is a block diagram showing the principal structural elements of an electric vehicle drive controller according to a preferred embodiment of the present invention.

FIG. 1 is a block diagram showing the principal structural elements of an electric vehicle drive controller according to a preferred embodiment of the present invention, including an accelerator 1, a DC power source 11, an electric power converter 14, a motor 15, and a control unit 40. The electric power converter 14 converts DC electric power from the power source 11 into AC, and supplies it to the motor 15. The accelerator 1 converts an accelerator pedal position input by an operator into an electrical signal, which is input to the torque command generating unit 2 inside of the control unit 40, for controlling the electric power converter 14. A basic torque command 2a which is a control variable for the torque to be generated by the motor 15 is determined by the torque command generating unit.

The basic torque command 2a is input to the filter 3 where it is filtered to provide a torque command 3a, which in turn is input to the torque current calculating means 4. The basic torque command 2a is also input to the magnetic flux generator 5 which generates a magnetic flux command 5a corresponding to it, using a table or function. The generated magnetic flux command 5a is then input to the torque current calculator 4, which calculates a torque current command 4a according to the input torque command 3a and magnetic flux command 5a. The calculated torque current command 4a is input to the vector control calculator 13.

The magnetic flux command 5a generated in the magnetic flux generator 5 is input not only to the torque current calculator 4, but also to the exciting current calculator 7, and to an exciting reactance generator 6. The exciting reactance generator 6 generates a control variable for the exciting reactance corresponding to the input magnetic flux command 5a, using a table or function. The generated exciting reactance 6a is then input to the exciting current generator 7, which calculates an exciting current command 7a from the input magnetic flux command 5a and the exciting reactance 6a, and transmits it to the vector control calculator 13.

The magnetic flux command 5a is also input to the slip frequency generator 8, which receives as additional inputs a secondary resistance detection value 9a and the torque current command 4a. The secondary resistance detector 9 receives the temperature of the motor 15 as a signal of resistance or voltage from the temperature detector 17, and calculates the secondary resistance detection value 9a corresponding to the temperature of the wire wound resistor of the motor 15.

The slip frequency calculator 8 uses the input magnetic flux command 5, secondary resistance detection value 9a, and torque current command 4a to calculate the slip frequency 8a, which is input to the vector control calculating means 13.

The motor 15 is equipped with a rotating speed detector 16 which converts rotating speed of the motor into a signal for transmission. The speed detector uses the signal from the rotating speed detector 16 to calculate a rotating speed 10a, which is output to the vector control calculator 13.

As already mentioned, the torque current command 4a, exciting current command 7a, slip frequency command 8a, and rotating speed 10a are input to the vector control calculator 13 which generates a primary current command 13a, phase angle command 13b, and primary frequency command 13c. The latter commands are provided to the electric power converter 14, which supplies a current to the motor 15 to generate required torque. The voltage 11a from the power source 11 is transmitted to the correction coefficient calculator 12, which calculates a correction coefficient KVB 12a corresponding thereto, and provides it to the magnetic flux generator 5 to correct the control variable for the magnetic flux command 5a corresponding to the power source voltage 11a. A power density signal from the power source 11 can be used instead of this power source voltage 11a.

According to the present invention, it is possible with the above-mentioned configuration to generate a magnetic flux command 5a corresponding to the degree of actuation of an input device by an operator, or required torque command 2a, and to decrease the magnetic flux command (i.e., exciting current) when the torque command is small. Consequently, because no useless current needs to be supplied, it is possible to reduce reactive power and increase the efficiency. Further, because the magnetic flux command is corrected according to the power source voltage or other values, a drive unit can be operated on a favorable operating point by correcting the magnetic flux command in case of a higher voltage.

Figure 2:
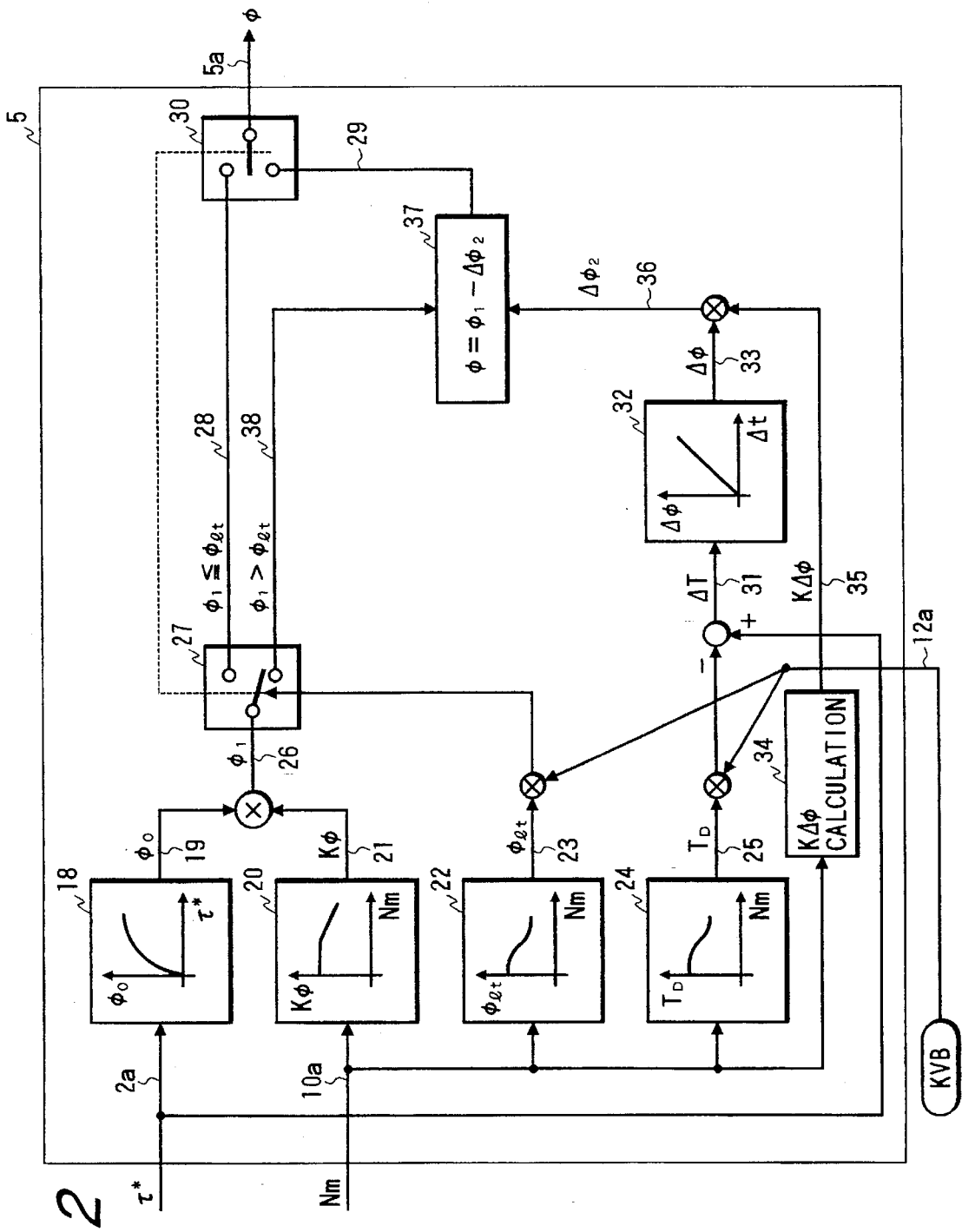
FIG. 2 is a detailed block diagram showing the magnetic flux generating means in FIG. 1.
Figure 3A:
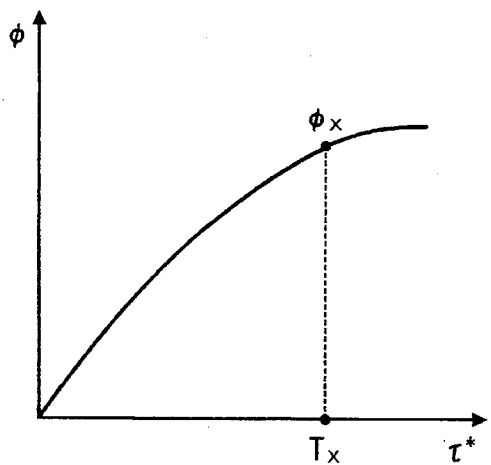
FIGS. 3(a)–(d) are graphic depictions of the process of generating magnetic fluxes in the electric vehicle drive controller shown in FIG. 1.
Figure 3B:
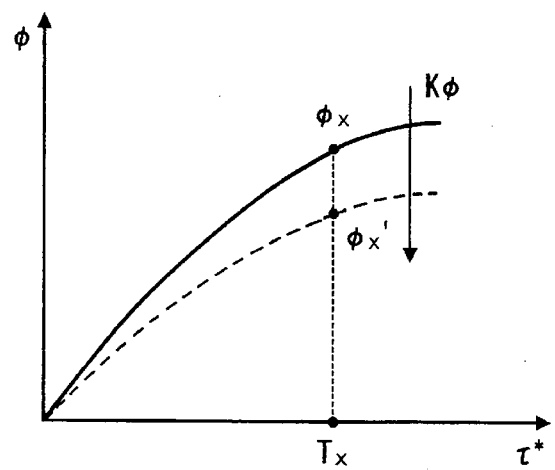
Figure 3C:
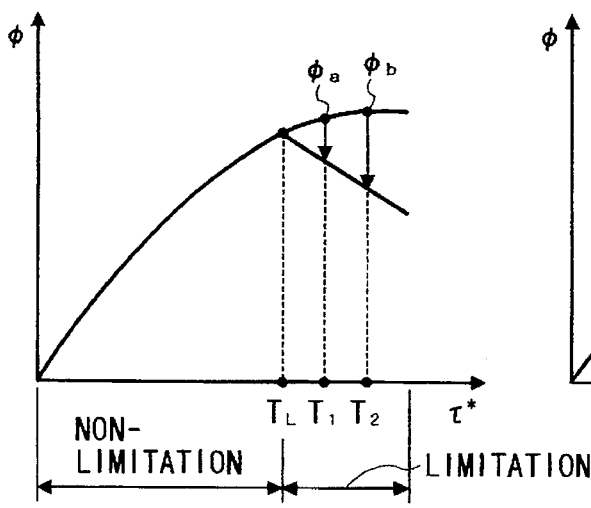
Figure 3D:
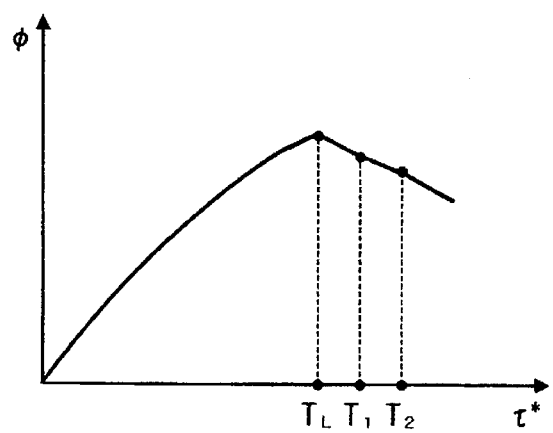

FIG. 2 is a detailed block diagram showing the magnetic flux generator 5 included in the basic block diagram of FIG. 1, representing a preferred embodiment of the present invention.

The basic torque command 2a is first input to the basic magnetic flux generator 18, which uses it to generate a required magnetic flux value, using a table or function according to the basic torque command 2a, and outputs a basic magnetic flux 19, which is designated as $\phi_0$.

On the other hand, the rotating speed 10a of the motor 15 is input to the basic magnetic flux rotation correction coefficient generating means 20, which uses it to calculate a coefficient for increasing or decreasing the basic magnetic flux 19, using a table or function, and outputs a basic magnetic flux rotation correction coefficient 21, which is designated as $K_\phi$. The rotating speed 10a is also input to the magnetic flux limiting value generator 22, which calculates the upper limit of the control variable for the magnetic flux to be applied to the motor using a table or function, and outputs a magnetic flux limiting value expressed as $\phi_1$. The basic magnetic flux ($\phi_0$) 19 is then used together with the basic magnetic flux rotation correction coefficient ($K_\phi$) 21 to generate a basic correction magnetic flux ($\phi_1$) 26 (which is the basic magnetic flux 19 decreased or increased by the basic magnetic flux rotation correction coefficient 21).

The calculated basic correction magnetic flux 26 and the magnetic flux limiting value ($\phi_{lt}$) 23, are input to the magnetic flux limitation comparing unit 27, where they are compared. If the magnetic flux limiting value 23 is greater than the basic correction magnetic flux 26, it is unnecessary to limit the magnetic flux, and the basic correction magnetic flux ($\phi_1$) 26 is transmitted via the non-limited magnetic flux selection route 28, to the magnetic flux output selector 30. Because the selection of the non-limited magnetic flux selection route 28 is interlocked (dotted line) with the selection in the magnetic flux output selector 30, the route is switched to output the basic correction magnetic flux ($\phi_1$) 26 of the non-limited magnetic flux selection route 28 as a magnetic flux command 5a. Thus, the comparing unit 27 functions so that the basic correction magnetic flux 25 is finally output as a magnetic flux command 5a.

If the basic correction magnetic flux ($\phi_1$) 26 is greater than the magnetic flux limiting value ($\phi_{lt}$) 23 in the basic magnetic flux comparing unit 27, this indicates that magnetic flux in excess of a limit is to be supplied to the motor. To limit the magnetic flux, the selection route of the basic magnetic flux comparing unit 27 is switched to the limited magnetic flux selection route 38, and the basic correction magnetic flux 26 is transmitted to the magnetic flux limitation calculating means 37 via the limited magnetic flux selection route 38.

A torque limitation command value ($T_D$) 25 calculated by the torque command limiting value generator 24 is adjusted by the correction coefficient 12a (KVB) and input to a subtraction unit, which calculates deviation from the basic torque command 2a by deducting the basic torque command ($\tau^*$) 2a from the torque limitation command value 25, and outputs the result as the torque limitation deviation ($\Delta T$) 31. If the torque limitation command value 25 is greater than the basic torque command 2a, the torque limitation deviation ($\Delta T$) 31 becomes a negative value, and if the torque limitation command value 25 is smaller than the basic torque command 2a, the torque limitation deviation 31 becomes a positive value.

When the torque limitation deviation ($\Delta T$) 31 is positive, the magnetic flux decrease calculator 32 calculates the basic magnetic flux decrease ($\Delta\phi$) 33 which is used (if the basic torque command 2a reaches or exceeds a point above a certain optional torque command) to decrease excessive magnetic flux according to the value of the torque limitation deviation 31. Thereafter, using the rotating speed 10a, the magnetic flux decrease correction coefficient calculator 34 determines a magnetic flux decrease correction coefficient ($K\Delta\phi$) 35, which is used to adjust the basic magnetic flux decrease 33. That is, the basic magnetic flux decrease 33 and magnetic flux decrease correction coefficient 35 are combined to obtain the final magnetic flux decrease ($\Delta\phi_2$) 36.

With the above processes, as the amount of any excess of the torque command ($\tau^*$) 2a over the torque command limiting value ($T_D$) 25 increases, the basic magnetic flux decrease ($\Delta\phi$) 33 is increased, so as to decrease the basic magnetic flux ($\phi_0$). And as the rotating speed increases, the magnetic flux decrease correction coefficient ($K\Delta\phi$) 35 functions to increase or decrease the basic magnetic flux decrease 33.

The calculated final magnetic flux decrease ($\Delta\phi_2$) 36 and the basic correction magnetic flux ($\phi_1$) 26 transmitted by the limited magnetic flux selection route 38 are input to the magnetic flux limitation calculator 37, which calculates the limitation magnetic flux 29 by deducting the final magnetic flux decrease ($\Delta\phi_2$) 36 from the basic correction magnetic flux 26, and the result is output through the magnetic flux output selector 30, as the magnetic flux ($\phi$) 5a.

With the above configuration, because the basic torque command ($\tau^*$) 2a functions in a range below the limiting value, when the basic torque command 2a is small, the magnetic flux ($\phi$) 5a is output without limitation. However, when the basic torque command 2a reaches the limiting value or a control variable in excess of the limiting value, if a magnetic flux command ($\phi$) 5a is output in the usual manner, motor magnetic flux becomes excessive, causing a voltage increase, so that the voltage exceeds the limit of the capacity of the electric power converter 14. To prevent this problem, the control variable of the magnetic flux command ($\phi$) 5a is limited corresponding to the rotating speed 10a and basic torque command 2a, to restrict excessive motor magnetic flux and the resulting voltage increase of the motor.

FIG. 3 represents an embodiment of the present invention showing the process of generating magnetic fluxes described in FIG. 2. The horizontal axis in each of curves (a) to (d) is the torque command and the vertical axis is the magnetic flux command. First, a basic magnetic flux $\phi_x$ is determined from a torque command $T_x$ at an optional point in curve (a) of FIG. 3. The magnetic flux thus determined does not reflect the rotating speed of the motor. In curve (b), the magnetic flux is varied using a magnetic flux correction coefficient $K\phi$, which corresponds to the rotating speed of the motor. As a result, $\phi_x$ obtained on curve (a) of FIG. 3 changes into $\phi_x'$ after being corrected with the coefficient. Then, as shown in curve (c) of FIG. 3, whether or not the magnetic flux needs to be limited is determined by $T_L$, depending upon the value of the torque command at the moment when the calculation is about to be made. If $T_x$ is smaller than $T_L$, the non-limitation range is applied, and if not, the limitation range applies.

When the non-limitation range applies, $\phi_x'$ obtained on curve (b) of FIG. 3 can be used for the calculation as it is. When the limitation range applies, for example, when the torque command is equal to $T_1$, deduct $T_L$ from $T_1$ as expressed by equation 'a' and use the result as the value $\phi_a$. This can be calculated simply by following the equation 'a' or by referring to the table using the result of ($T_1 - T_L$). Even when the torque command is equal to value $T_2$, the same calculation using the equation 'a' applies, and the magnetic flux is limited in the same manner. As shown in curve (d) of FIG. 3, a modified characteristic of the limited magnetic flux command $\phi$, which can be used to avoid supplying excessive magnetic flux to the motor, can be obtained as described above, and voltage increase of the motor can be restricted.

In addition, because a value for limiting the magnetic flux is calculated by means of a table or function, it is possible to select either a linear or a non-linear characteristic for supplying the magnetic flux.

Figure 4:
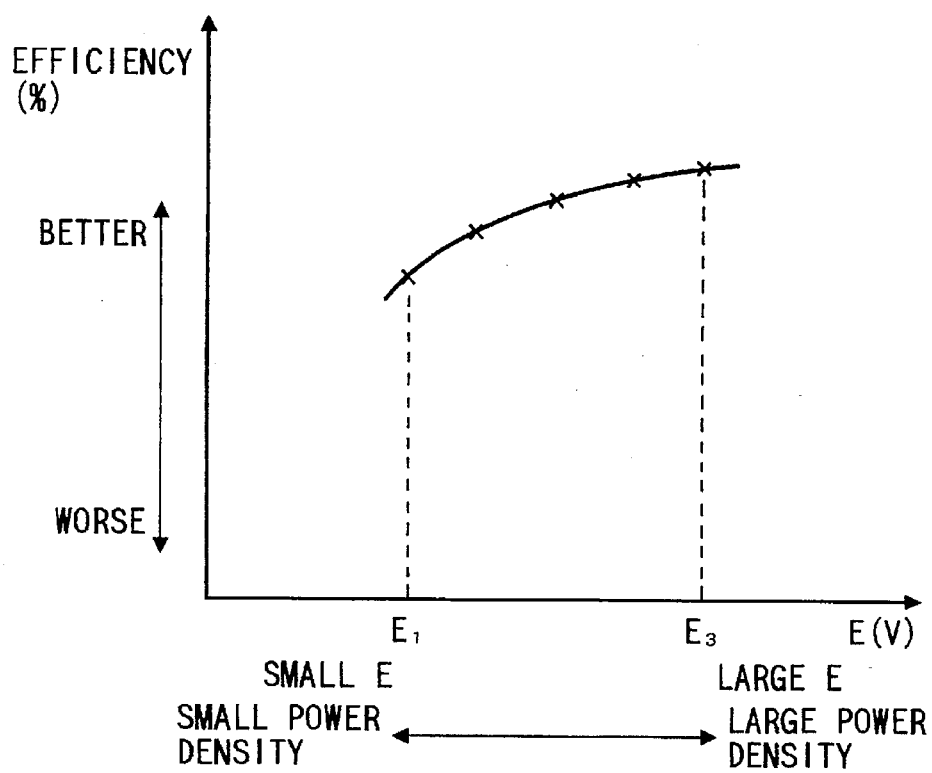
FIG. 4 shows the change of the efficiency vs. motor voltage in the electric vehicle drive controller shown in FIG. 1.

The magnetic flux obtained from the calculation illustrated in FIG. 3 is normally determined according to the upper limit of the voltage which can be applied to the motor, which depends upon the capacity of the electric power converter or the minimum voltage of the power source input from the electric power converter. A characteristic of a drive unit using an induction motor is that current through the motor is lower if the voltage applied to the motor is set higher than the design voltage (even though the output power is the same). Therefore, copper loss of the motor and loss in the electric power converter decrease, and the efficiency increases. FIG. 4 shows this characteristic. The horizontal axis is the voltage of the motor and the vertical axis is the efficiency. If the voltage which can be supplied to the motor from the electric power converter is equal to E1 when the power source voltage supplied to the electric power converter falls under the minimum operating condition, the magnetic flux supplied to the motor must be designed according to this motor voltage E1. In practice, however, the motor voltage is examined in view of the efficiency, and increasing the actual motor voltage up to E3 achieves a higher efficiency for the reason mentioned above. However, if the motor voltage is designed at E3, the motor may possibly suffer from insufficient voltage when the power source voltage falls under the minimum operating condition, because the electric power converter can supply the voltage no greater than E1 to the motor.

Figure 5:
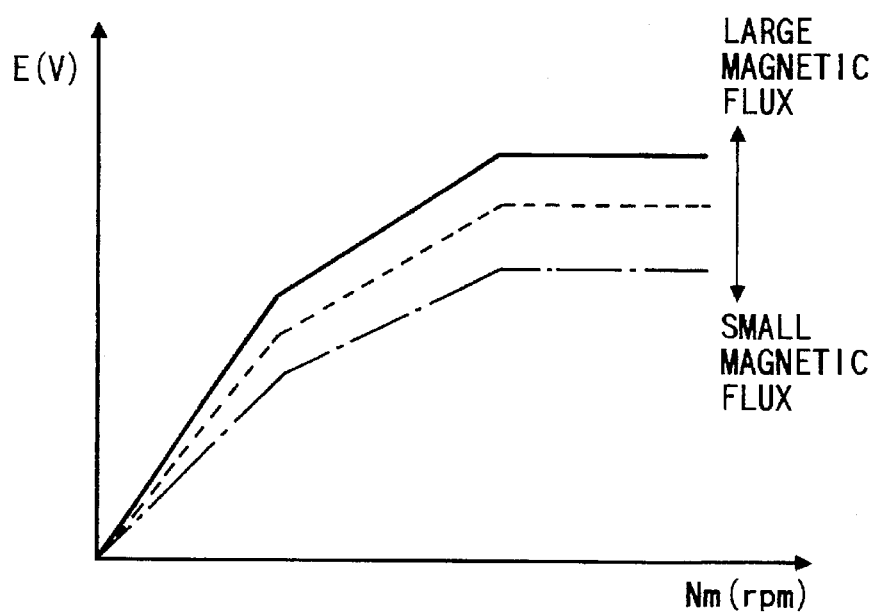
FIG. 5 shows the change of the motor voltage vs. magnetic flux in the electric vehicle drive controller shown in FIG. 1.

When the speed of the motor (rpm) is defined on the horizontal axis and the motor voltage is defined on the vertical axis as shown in FIG. 5, it is apparent that the voltage E applied to the motor increases as the magnetic flux is set larger, and E decrease as the magnetic flux is set smaller. Using this characteristic, the present invention maintains a very efficient operation, and operates the electric power converter within its capacity by adjusting the control variable of the magnetic flux according to the power source voltage (or the power density of a battery which is similar to the power source voltage), by increasing the magnetic flux when the power source voltage is high, and by decreasing the magnetic flux accordingly and limiting the motor voltage when the power source voltage is low.

FIG. 6 is an embodiment of the present invention showing a method for reducing the size of the electric power converter based on the method according to the present invention. In each of curves (a) to (c), the horizontal axis represents motor speed Nm and the vertical axis is the corresponding output characteristic and exciting current.

In vector control, the output torque is generally controlled by controlling the torque current while the exciting current (i.e., magnetic flux) is held constant. The magnetic flux $\phi$ is expressed by the equation below.

$$\phi = Lm \cdot Im (Wb) \qquad (1)$$

where $\phi$: magnetic flux

Lm: exciting reactance

Im: exciting current.

When the above applies, voltage E of the induction motor is expressed as follows.

$$E = \omega \cdot \phi = 2\pi f \cdot Lm \cdot Im \ (V) \qquad (2)$$

where

E: induction motor voltage f: drive frequency.

Figure 6A:
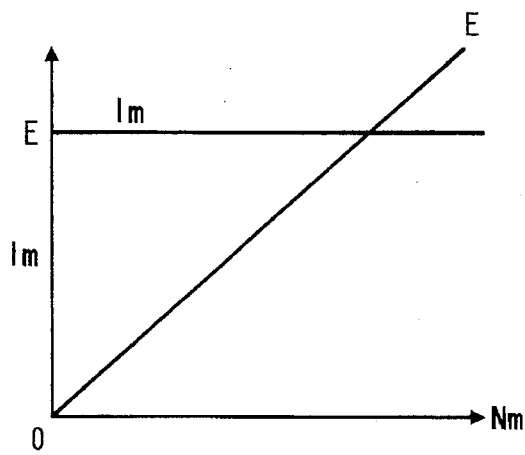
FIGS. 6(a)–(c) show the output characteristic vs. exciting current in the electric vehicle drive controller shown in FIG. 1.

As shown in FIG. 6(a), this means that if the exciting current Im is constant, voltage E of an induction motor increases in proportion to the drive frequency $\phi$.

If the motor is operated on the basis of this characteristic, the voltage E increases excessively in the high speed range and accordingly, an inverter having a higher voltage capacity must be provided. However, it is rare that an electric vehicle requires greater torque in the high speed range, and there is a certain limitation to the size of the electric power converter to be mounted on a vehicle in view of space and capacity of the vehicle itself. Thus, an electric power converter having such characteristic does not serve the purpose of reducing the size and weight of a unit.

Figure 6B:
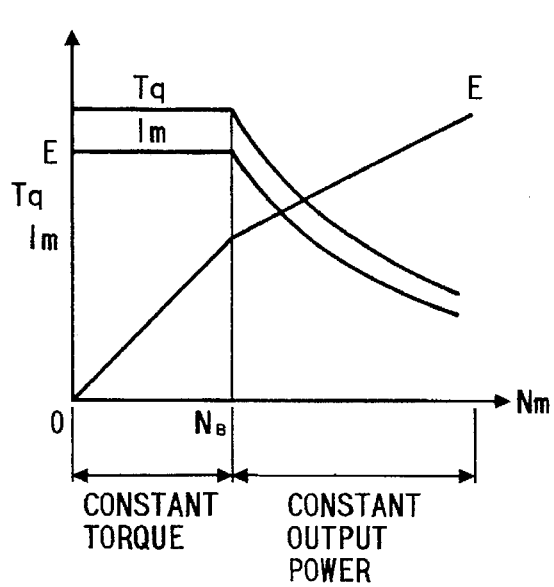

For this reason, as shown in FIG. 6(b), the method employed in the prior art was to maintain constant torque control while the motor speed is below the base rotating speed $N_B$, but to restrict increase of the voltage E and reduce the capacity of the electric power converter by limiting the magnetic flux (i.e., exciting current Im) in inverse proportion to the rotating speed N when the motor speed is above the base rotating speed NB.

However, even in case as shown in FIG. 6(b), wherein a method for weakening the exciting current Im in inverse proportion to the rotating speed N is employed, the voltage E is yet apt to increase and, for the same reason, there is a limitation to reducing the size of the electric power converter.

Figure 6C:
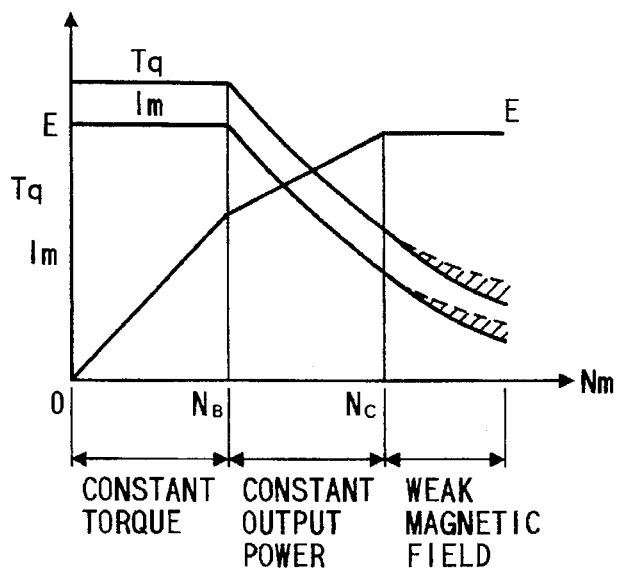

On the other hand, when an efficient controller according to the invention, having the characteristic as shown in FIG. 6(c), is employed for an electric vehicle, it is possible to decrease the magnetic flux before the voltage E increases to the limit of the capacity of the electric power converter. In this manner, the motor is controlled such that the voltage E should not increase as the rotating speed of the motor increases, because the magnetic flux (.i.e., exciting current Im) can be freely controlled in a linear or nonlinear manner in the high speed range above the rotating speed $N_C$ or in the high torque range. Therefore, the induction motor can be controlled up to a higher speed without increasing the capacity of the electric power converter.

Also, in the speed range up to the base rotating speed $N_B$, and in the constant output power domain with the speed from $N_B$ to $N_C$, in FIG. 6(c), the size of the electric power converter can be reduced without degrading the operability of the unit, because it is possible to generate the output power or torque of the same level as obtained by a method shown in FIG. 6(b).

Figure 7:
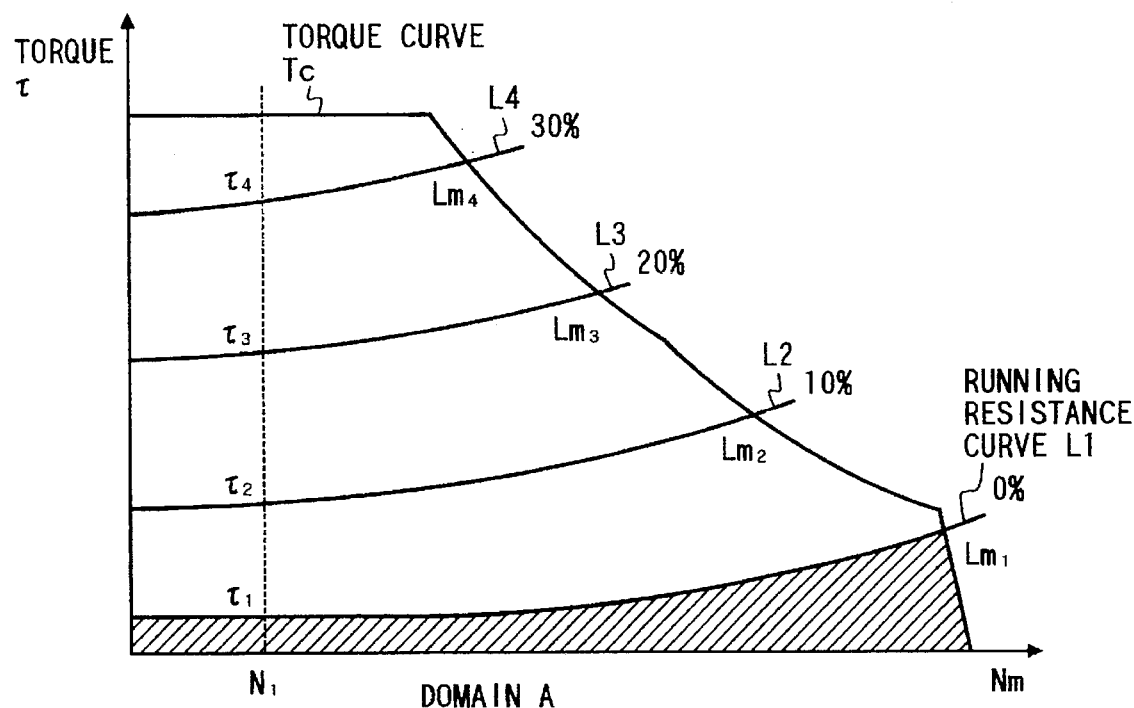
FIG. 7 shows the relation between the output characteristic and running resistance of an electric vehicle using the electric vehicle drive controller of FIG. 1.

FIG. 7 shows the relation between the torque characteristic, running resistance, and required torque of an electric vehicle. The horizontal axis is the motor rotating speed Nm and the vertical axis is the torque $\tau$, and torque characteristic of the motor ($\tau v$. Nm) is graphed. Torque curve Tc represents the characteristic when the motor outputs 100% torque, and running resistance curve L1 represents the running resistance when the electric vehicle runs on a flat road (grade 0%). The running resistance increases as the grade increases, as is shown by L2 for 10% grade, L3 for 20% grade, L4 for 30% grade, and so on. Intersections Lm1, Lm2, Lm3, and Lm4 of the output power curve Tc at 100% torque and the running resistance curves L1, L2, L3, and L4, respectively, represent the limit torque and motor rotating speed when the electric vehicle climbs up a slope.

In conventional control methods, a magnetic flux command for generating the exciting current or magnetic flux is determined in inverse proportion to the rotating speed of the motor, and the present motor rotating speed is assumed to be $N_1$; that is, the motor rotating speed itself is always $N_1$, regardless of whether the torque required for running is either $\tau_1, \tau_2, \tau_3$, or $\tau_4$. Thus, the exciting current or magnetic flux supplied to the motor is always the same, regardless of the required torque.

According to the present invention, if the required running torque changes, the magnetic flux command determines its control variable according to the required torque, i.e., the torque command as described in FIG. 1, even when the motor rotating speed is $N_1$. Therefore, for example, a magnetic flux command corresponding to $\tau_1$ is determined as a control variable for the required torque $\tau_1$, and a magnetic flux command corresponding to $\tau_3$ is determined for the required torque $\tau_3$, so that corresponding magnetic fluxes are generated in the motor.

When the torque required for running is small, in other words, when a vehicle is running within range A where the road is flat with 0% grade (probably the most frequent running condition of a vehicle on a street or highway) as represented by the running resistance curve L1 in FIG. 7, it is possible to run the vehicle with decreased magnetic flux command by employing the above method of the present invention. Comparing the method for generating the magnetic flux command according to the present invention with the prior art (based, for example, on an induction motor of 6 poles, 55 kW, and 105 Hz), the method of the present invention permits running the vehicle at a magnetic flux command which is reduced to about ⅕ that required by the ordinary method. As already stated, this leads to reduction of the reactive power and improvement of the efficiency during operation.

Comparing the overall efficiency of motor operation according to the two methods in range A (based on the above-described induction motor), it is found that the overall efficiency in the method of the present invention is better than that in the ordinary method by about 5 to 10%. Using the method of the present invention, it is possible to operate a drive unit more efficiently under the most frequent running condition of an electric vehicle.

Figure 8:
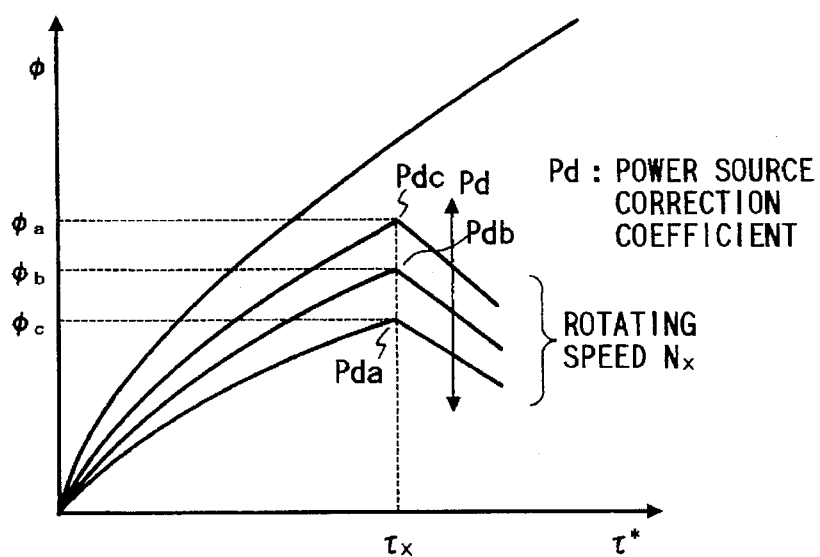
FIG. 8 shows the relation between the charge state of the power source and magnetic flux command correction of an electric vehicle using the electric vehicle drive controller shown in FIG. 1.

FIG. 8 illustrates the operation of an embodiment of the present invention, wherein the horizontal axis is the torque command and the vertical axis is the magnetic flux command, and shows correction of the magnetic flux command according to charge state Of the power source.

When an electric vehicle is operated using an optional torque command $\tau_x$, and optional motor rotating speed $N_x$, the correction coefficient Pd determined from charge state of the power source is calculated as Pda, Pdb, and Pdc, depending upon the charge state of the power source. The calculated power source correction coefficient Pd depends upon the charge state of the power source. For example, the correction coefficient becomes larger for Pdc when the residual charge of the battery is high, and becomes smaller for Pda when the residual charge of the battery is small. Here, with the configuration shown in FIG. 2, the magnetic flux limiting value 23, which is the output from the magnetic flux limiting value generator 22 for limiting the magnetic flux, is corrected by the correction coefficient Pd determined according to the charge state of the power source. The correction coefficient 12a in FIG. 2 is the correction efficiency Pd.

When the above correction is employed, and an electric vehicle is operated using the same torque command $\tau_x$ and motor rotating speed $N_x$, if the charge state of the power source is good, the correction coefficient becomes larger for Pdc and the magnetic flux command $\phi$ calculated according to the charge state of the power source is corrected closer to $\phi_C$. Hence, the magnetic flux increases. If the charge state of the power source is degraded, the correction coefficient becomes smaller for Pda, and the magnetic flux command is corrected to a smaller value for $\phi_a$. By employing this correction, it becomes possible, when the charge state of the power source is better, to increase the magnetic flux command and the voltage applied to the induction motor, and select the most efficient operating point.

The present invention permits a reduction of losses in the motor and electric power converter through corrections according to the charge state of the power source of the electric power converter, thereby achieving operation of the drive unit always at the most efficient operating point, and improving the efficiency. In other words, by adding corrections using the power source correcting unit, it is possible to increase the voltage applied to the motor, according to the charge state of the power source, within the limit of the output capacity of the electric power converter, drive the unit at the most efficient operating point, and operate it at the most efficient operating point within the capacity range of the unit and the power source.

Because the voltage applied to the motor can be freely set according to the motor rotating speed or the charge state of the power source, it is not required in high speed operation to apply a voltage to the motor which exceeds the capacity of the electric power converter. Thus, the size of the electric power converter can be reduced.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An electric vehicle comprising an induction motor for driving the electric vehicle, an electric power converter for converting the electric power from a DC power source and supplying the power to said induction motor, and a drive controller for controlling said induction motor via said electric power converter according to a given command, said drive controller dividing a basic torque command for controlling the primary current of said induction motor into a torque command and a magnetic flux command, generating a torque current component from said torque command and an exciting current component from said magnetic flux command, respectively, and vector-controlling said induction motor by utilizing said commands;

wherein said drive controller determining said magnetic flux command according to said basic torque command to said induction motor and rotating speed of said induction motor, and correcting said magnetic flux command by increasing or decreasing the command in correspondence to the quantity of state of said power source so that said magnetic flux command increases when the given quantity of state is favorable.

2. The electric vehicle as set forth in claim 1, wherein said drive controller includes:
- a basic magnetic flux command calculating means to calculate a basic magnetic flux command from said torque command,
- a rotating speed correcting means to correct said basic magnetic flux command according to the rotating speed of said induction motor,
- a magnetic flux limiting means to determine the upper limit of said magnetic flux command and a torque limiting means to determine the upper limit of said torque command both according to the rotating speed of said induction motor,
- a magnetic flux correcting means to calculate a magnetic flux correction value for correcting said magnetic flux command according to said torque command, and
- a magnetic flux rotating speed correcting means to calculate a coefficient for correcting said magnetic flux correction value according to the rotating speed of said induction motor.

3. The electric vehicle as set forth in claim 2, wherein each output of said torque limiting means and said magnetic flux limiting means includes a power source correcting means to correct said magnetic flux command according to the quantity of state of said power source.

4. The electric vehicle as set forth in claim 1, wherein the power source for said electric power converter is battery, and said magnetic flux command is corrected according to the residual charge of the battery.

5. The electric vehicle as set forth in claim 1, wherein the power source for said electric power converter is battery, and limiting value of said magnetic flux command is corrected according to the power density of the battery.

6. An electric vehicle which comprising an induction motor for driving the electric vehicle, an electric power converter for converting the electric power from a DC power source and supplying the power to said induction motor, and a drive controller for controlling said induction motor via said electric power converter according to a given command, said drive controller dividing a basic torque command for controlling the primary current of said induction motor into a torque command and a magnetic flux command, generating a torque current component from said torque command and an exciting current component from said magnetic flux command, respectively, and vector-controlling said induction motor by utilizing said commands;
- wherein said drive controller maintaining said magnetic flux command at a constant value according to said basic torque command to said induction motor and rotating speed of said induction motor until the magnetic flux command reaches the base rotating speed NB but decreasing said magnetic flux command in correspondence to the increase of the rotating speed after the magnetic flux command exceeds the aforesaid base rotating speed NB, and also
- correcting said magnetic flux command by increasing or decreasing the command in correspondence to the quantity of state of said power source so that said magnetic flux command increases when the given quantity of state is favorable.

7. A drive control method for an electric vehicle which comprising an induction motor for driving the electric vehicle, an electric power converter for converting the electric power from a DC power source and supplying the power to said induction motor, and a controller for controlling said induction motor via said electric power converter according to a given command, wherein said controller dividing a basic torque command for controlling the primary current of said induction motor into a torque command and a magnetic flux command, generating a torque current component from said torque command and an exciting current component from said magnetic flux command, respectively; and vector-controlling said induction motor utilizing said commands,
the improvement comprising the steps of;
- determining said magnetic flux command according to said basic torque command to said induction motor and rotating speed of said induction motor, and
- correcting said magnetic flux command by increasing or decreasing the command in correspondence to the quantity of state of said power source so that said magnetic flux command increases when the given quantity of state is favorable.

8. The electric vehicle drive control method as set forth in claim 7, wherein, said power source is battery, and said magnetic flux command is corrected according to the residual charge of the battery.

9. The electric vehicle drive control method as set forth in claim 7, wherein, said power source is battery, and limiting value of said magnetic flux command is corrected according to the power density of the battery.

10. A drive control method for an electric vehicle which comprising an induction motor for driving the electric vehicle, an electric power converter for converting the electric power from a DC power source and supplying the power to said induction motor, and a controller for controlling said induction motor via said electric power converter according to a given command, said controller dividing a basic torque command for controlling the primary current of said induction motor into a torque command and a magnetic flux command, generates a torque current component from said torque command and an exciting current component from said magnetic flux command, respectively; and vector-controlling said induction motor utilizing said commands;
the improvement comprising the steps of,
- maintaining said magnetic flux command at a constant value according to said basic torque command to said induction motor and rotating speed of said induction motor until the magnetic flux command reaches the base rotating speed NB but decreasing said magnetic flux command in correspondence to the increase of the rotating speed after the magnetic flux command exceeds the aforesaid base rotating speed NB, and
- correcting said magnetic flux command by increasing or decreasing the command in correspondence to the quantity of state of said power source so that said magnetic flux command increases when the given quantity of state is favorable.

* * * * *